United States Patent [19]

Bruhn

[11] Patent Number: 4,976,398

[45] Date of Patent: Dec. 11, 1990

[54] FUEL TANK FOR AGGRESSIVE LIQUID FUELS

[75] Inventor: Hansdieter Bruhn, Bremen, Fed. Rep. of Germany

[73] Assignee: Erno Raumfahrttechnik GmbH, Bremen, Fed. Rep. of Germany

[21] Appl. No.: 426,798

[22] Filed: Oct. 24, 1989

[30] Foreign Application Priority Data

Nov. 2, 1988 [DE] Fed. Rep. of Germany ....... 3837137

[51] Int. Cl.⁵ ............................................. B64D 37/00
[52] U.S. Cl. ........................... 244/135 R; 244/158 R; 137/38; 137/44; 220/562
[58] Field of Search ....................... 244/135 R, 158 R; 220/85 F, 1 V; 141/31, 34; 137/38, 44, 53

[56] References Cited

U.S. PATENT DOCUMENTS 2,163,988  6/1939  Stacey ................................... 137/38

FOREIGN PATENT DOCUMENTS 683854   4/1964  Canada .......................... 244/135 R
2109760  6/1983  United Kingdom ............ 244/135 R Primary Examiner—Joseph F. Peters, Jr.
Assistant Examiner—Christopher P. Ellis
Attorney, Agent, or Firm—W. G. Fasse; D. H. Kane, Jr.

[57] ABSTRACT

A fuel tank for storing aggressive liquid fuels, especially fuel for operating satellite engines has an oblong shape with hemispherical ends. A fuel collecting device (12) is arranged inside the fuel tank. The collecting device is so constructed and equipped with guide vanes for feeding the fuel, and with a pipe system including collecting vessels with screens that a fuel supply to the engines is assured under any conceivable operating conditions, since surface tension and capillary forces assure a refilling of the collecting device inside the fuel tank.

5 Claims, 1 Drawing Sheet

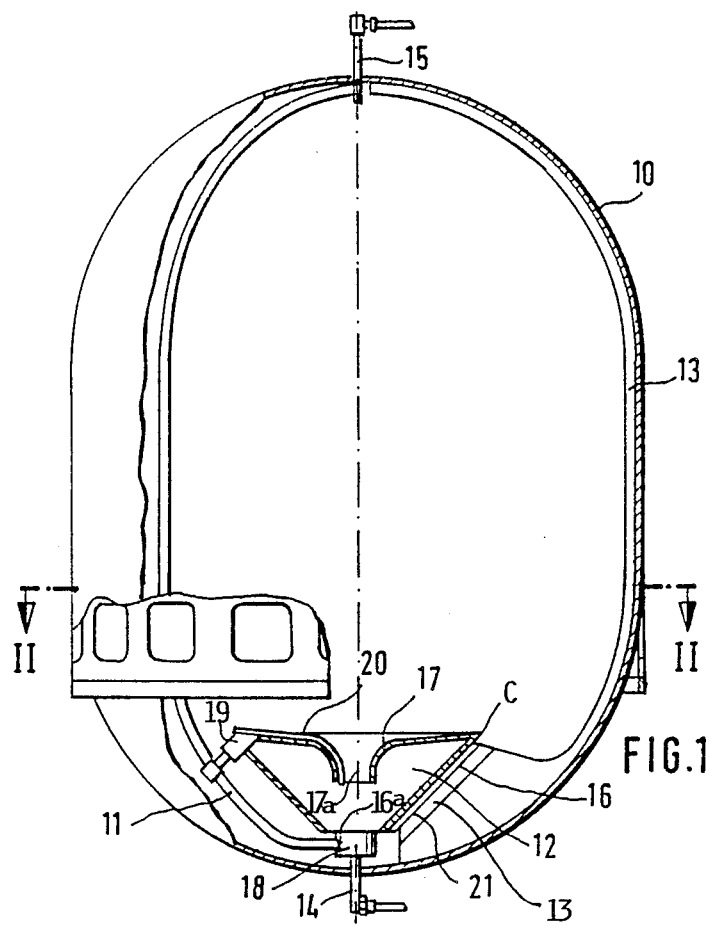
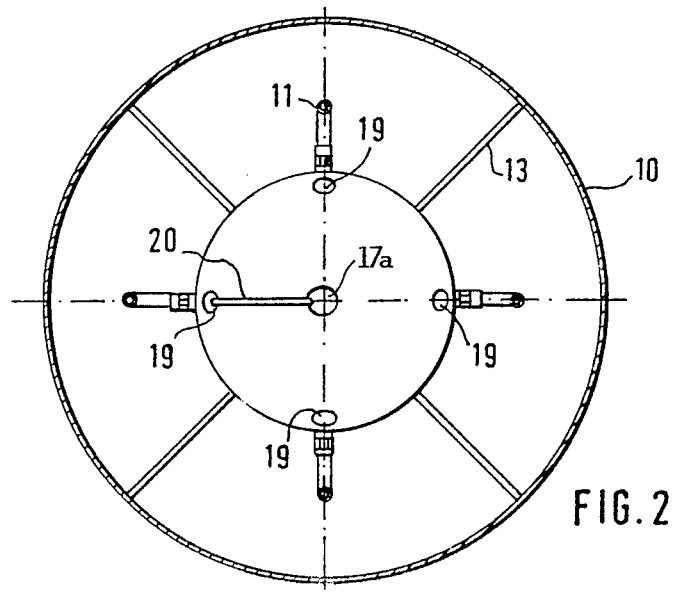

FUEL TANK FOR AGGRESSIVE LIQUID FUELS

FIELD OF THE INVENTION

The invention relates to a fuel tank for storing aggressive liquids, especially fuels for operating satellite engines. Such tanks are equipped with a connector for filling the tank and for retrieving fuel from the tank. A collecting device is arranged inside the tank for cooperation with guide vanes for pumping fuel out of the tank in a bubble-free manner under zero gravity conditions.

BACKGROUND OF THE INVENTION

It is known to maintain satellites in a defined relative position, for example, relative to the earth. Such relative positions enable the satellite to perform its function, especially to maintain communication links. Thus, it is necessary to equip satellites with position control devices in order to make corrections in all degrees of freedom. For this purpose small propulsion engines are used which make it possible to cause the correction movement by exactly proportioned or dosed impulses. The operation of these small propulsion engines, however, requires fuel which must be carried along by the satellite in a fuel tank. The fuels involved are mostly liquid fuels which supply the propulsion engines with the required fuel through a gas generator.

However, in operating such propulsion plants, care must be taken that the propulsion plants receive only the required fuels which must not contain any foreign gases, because generally propulsion gases are used for driving the fuel out of the tank. However, the propulsion gases can mix with the fuel. Therefore, it is necessary, especially in connection with fuel tanks which make use of the surface tension for transporting the fuel, to take special steps for separating the propulsion gas and the fuel. It has been found that small mesh screens are suitable for this purpose. These small mesh screens are arranged on collecting devices or in collecting vessels in the fuel tanks.

The propulsion engines for controlling the position of satellites must work under zero gravity conditions as well as under conditions in which gravity is effective. Therefore, it is necessary to construct the fuel tanks in such a way that the fuel is available in any conceivable situation. This requirement, however, is not met by conventional fuel tanks.

OBJECTS OF THE INVENTION

In view of the above it is the aim of the invention to achieve the following objects singly or in combination:

to provide a fuel tank of the type described above which is capable to feed or convey the fuel under any and all conceivable operating conditions;

to construct a fuel tank which makes use of surface tension as well as capillary action to assure the required fuel supply; and to effectively avoid the inclusion of gas bubbles in the fuel that is being supplied to a gas generator for producing propulsion gas for a position control engine in a satellite under gravitational and zero gravity operating conditions.

SUMMARY OF THE INVENTION

A fuel tank of the above type is characterized according to the invention in that a collecting device comprises a container that is open at both ends and that is formed by cone shaped container defining walls which are connected to each other at their larger diameter ends. The smaller diameter end of the cone-shaped container defining walls form the openings, whereby one of the openings is arranged immediately next to a collecting vessel which in turn is arranged at a connector for fuel removal from the tank. The collecting vessel is connected through a pipe system to further collecting vessels which are arranged in the cone shaped container defining walls in the zone of the larger diameter.

The fuel tank according to the invention is thus equipped with a collecting device which comprises a collecting container open at both ends and which is capable due to its shape formed by its container defining walls, to hold fuel and to supply that fuel under gravity operating conditions as well as under zero gravity operating conditions. Further modifications and advantageous embodiments of the invention are disclosed in claims 2 to 5.

BRIEF DESCRIPTION OF THE DRAWINGS

In order that the invention may be clearly understood, it will now be described, by way of example, with reference to the accompanying drawings, wherein:

FIG. 1 is a side view of a fuel tank according to the invention, shown partially in section and partially broken away; and FIG. 2 is a sectional view along section line II—II in FIG. 1.

DETAILED DESCRIPTION OF PREFERRED EXAMPLE EMBODIMENTS AND OF THE BEST MODE OF THE INVENTION

Referring to FIGS. 1 and 2, there is shown a somewhat oblong fuel tank 10 with hemispherical ends. Inside the tank there are arranged a pipe system 11, a collecting device 12, and guide vanes 13. The lower end of the fuel tank 10 is equipped with a connector 14 for taking out fuel from the tank. The upper end is equipped with a connector 15 for venting the tank or for admitting propulsion gas into the tank for pressing the liquid fuel out of the tank. The guide vanes 13 of sheet metal are secured to the inner surface of the fuel tank wall 10 to extend substantially radially inwardly to form a crossing junction at a central location defined by the connectors 14 and 15. The guide vanes 13 are formed in the zone of the connector 14 for fuel removal, in such a manner that a conical mount is provided into which the cone shaped collecting device 12 is insertable.

The collecting device 12 is made of an outer conical wall 16 forming a frustum and an inner conical wall 17 also forming a frustum. To make the frustum of the inner conical wall 17 so that it has a small axial length, the two conical walls 16 and 17 have different conical angles. The large diameter ends of the conical walls 16 and 17 are connected to each other around the circumference C. The small diameter ends of the conical walls form openings 16a and 17a. The connection C of the two conical walls 16 and 17 to each other is such that the cone of the curved inner wall 17 reaches into the frustum formed by the outer conical wall 16.

A collecting vessel 18 equipped with a small mesh screen is provided on the inside of the connector 14 for removal of liquid fuel. The collecting vessel 18 communicates on the one hand with the connector 14 and on the other hand it reaches practically into the opening 16a formed by the outer wall 16. The collecting vessel 18 may be one as disclosed in German Patent Publication DE-3,520,676C2. Four pipes forming the pipe system 11 are connected to the collecting vessel 18. These pipes 11 are connected to further collecting vessels 19 comparable to the collecting vessel 18, and end in the vessel 18. The collecting vessels 19 are located uniformly distributed in the outer wall 16 of the collecting device 12 in the zone of the largest diameter. A thin venting pipe 20 leads from the opening 17a of the inner wall 17 to the connection with the outer wall 16. The pipe 20 extends outside the collecting device 12.

In operation the collecting device 12 within the fuel tank 10 assures a fuel supply to the propulsion engines under all conceivable operational conditions. The fuel is collected in the collecting device 12 due to the surface tension and due to capillary forces. The fuel is collected in the ring space between the outer wall 16 and the inner wall 17. Due to the shape of the collecting device 12, the fuel cannot escape from the collecting device or it can escape only to a limited extent, even when the tank is subject to accelerations in any one of the three axes of space. Thus, the fuel is always present in the collecting device 12 for use when needed. The guide vanes 13 make sure that after withdrawal of fuel the collecting device 12 is refilled, thereby again using surface tension and capillary forces for the refilling in such a way that the fuel is lead into the collecting device 12 by capillary forces. Thus, the fuel is always available until its complete removal from the tank. The collecting device 12 may form two collecting spaces interconnected at their smaller diameters to form a collecting unit. The collecting device is further equipped with inwardly extending guide vanes 21 which assure the refilling of the collecting device 12 primarily by surface tension action.

Although the invention has been described with reference to specific example embodiments, it will be appreciated that it is intended to cover all modifications and equivalents within the scope of the appended claims.

What I claim is:

1. A fuel tank for storing agressive liquid fuels, especially fuels for operating satellite engines, comprising connector means for filling said tank with fuel and for removing fuel from said tank, a collecting means inside said tank, guide vanes inside said tank, said connector means cooperating with said collecting means and with said guide vanes for enabling pumping fuel in a bubble-free manner under zero-gravity operating conditions, said collecting means (12) comprising a container open at both ends and having conical container defining walls (16, 17) which are connected to each other at their larger diameters, said conical walls having small diameter ends defining openings (16a, 17a), a collecting vessel (18), one of said openings (16a) being arranged immediately next to said collecting vessel (18) for feeding fuel through said one opening into said collecting vessel (18), a conduit communicating said collecting vessel (18) with said connector means for removing fuel from said tank, further collecting vessels (19) secured to said container defining conical walls in a zone of said larger diameters of said conical walls (16, 17), and pipe means (11) for connecting said first mentioned collecting vessel (18) with said further collecting vessels (19).

2. The fuel tank of claim 1, wherein said conical container defining walls comprise two walls (16, 17) having different conical angles defining different cones.

3. The fuel tank of claim 1, wherein said conical container defining walls form a frustum, and wherein one of said conical container defining walls forms a central funnel shape.

4. The fuel tank of claim 1, further comprising a venting pipe leading away from an opening of said collecting device (12) which opens on both sides.

5. The fuel tank of claim 1, further comprising four guide vanes (13) arranged in a cross-configuration forming a junction and extending along an inner wall of said fuel tank for cooperation with said collecting device (12), said guide vanes holding and securing said collecting device at said junction.

* * * * *